(12) United States Patent
Fuchs et al.

(10) Patent No.: US 11,036,237 B2
(45) Date of Patent: Jun. 15, 2021

(54) RADAR-BASED SYSTEM AND METHOD FOR REAL-TIME SIMULTANEOUS LOCALIZATION AND MAPPING

(71) Applicant: ARBE ROBOTICS LTD., Tel Aviv (IL)

(72) Inventors: Ronit Roxana Fuchs, Rehovot (IL); Ben Rathaus, Kadima (IL)

(73) Assignee: ARBE ROBOTICS LTD., Kadima (IL)

( * ) Notice: Subject to any disclaimer, the term of this patent is extended or adjusted under 35 U.S.C. 154(b) by 146 days.

(21) Appl. No.: 16/481,513

(22) PCT Filed: Jan. 30, 2018

(86) PCT No.: PCT/IL2018/050103
§ 371 (c)(1),
(2) Date: Jul. 29, 2019

(87) PCT Pub. No.: WO2018/142395
PCT Pub. Date: Aug. 9, 2018

(65) Prior Publication Data
US 2019/0384318 A1 Dec. 19, 2019

(30) Foreign Application Priority Data
Jan. 31, 2017 (IL) .......................................... 250382

(51) Int. Cl.
*G05D 1/02* (2020.01)
*G01S 13/89* (2006.01)
(Continued)

(52) U.S. Cl.
CPC ............ *G05D 1/0274* (2013.01); *G01S 13/32* (2013.01); *G01S 13/86* (2013.01); *G01S 13/89* (2013.01); *G05D 1/0272* (2013.01)

(58) Field of Classification Search
CPC ...... G05D 1/02; G05D 1/0274; G05D 1/0272; G01S 13/32; G01S 13/86; G01S 13/89
See application file for complete search history.

(56) References Cited

U.S. PATENT DOCUMENTS

| 5,751,289 A | * | 5/1998 | Myers | ..................... G06T 15/10 |
| | | | | 345/419 |
| 2011/0054689 A1 | * | 3/2011 | Nielsen | ................ G05D 1/0088 |
| | | | | 700/258 |

(Continued)

OTHER PUBLICATIONS

Schuster F, Worner et al, "Robust localization based on radar signal clustering in intelligent vehicles", Symposium (IV), 2016 IEEE, Jun. 19, 2016, pp. 839-844 (6 pages).

(Continued)

*Primary Examiner* — Tan Q Nguyen
(74) *Attorney, Agent, or Firm* — Roach, Brown, McCarthy & Gruber, P.C.; Kevin D. McCarthy

(57) ABSTRACT

A method for performing Simultaneous Localization And Mapping (SLAM) of the surroundings of an autonomously controlled moving platform (such as UAV or a vehicle), using radar signals, comprising the following steps: receiving samples of the received IF radar signals, from the DSP; receiving previous map from memory; receiving data regarding motions parameters of the moving platform from an Inertial Navigation System (INS) module, containing MEMS sensors data; grouping points to bodies using a clustering process; merging bodies that are marked by the clustering process as separate bodies, using prior knowledge; for each body, creating a local grid map around the body with a mass function per entry of the grid map; matching between bodies from previous map and the new bodies; calculating the assumed new location of the moving platform for each on the mL particles using previous frame (Continued)

results and new INS data; for each calculated new location of the mL particles with normal distribution, sampling N assumed locations; for each body and each body particle from the previous map and for each location particle, calculating the velocity vector and orientation of the body between previous and current map, with respect to the environment using the body velocity calculated in previous step and sampling N2 particles of the body, or using image registration to create one particle where each particle contains the location and orientation of the body in the new map; for each particle from the collection of particles of the body: propagating the body grid according the chosen particle; calculating the Conflict of the new observed body and propagated body grid, using a fusion function on the parts of the grid that are matched; calculating Extra Conflict as a sum of the mass of occupied new and old grid cells that do not have a match between the grids; calculating particle weight as an inverse weight of the combination between Conflict and Extra conflict; for each N1 location particle, calculating the weight as the sum of the best weight per body for that particle; resampling mL particles for locations according to the location weight; for each body, choosing mB particles from the particles with location in one of the mL particles for the chosen location, and according to the particles weights; for each body and each one of the mB particles calculate the body velocity using motion model; and creating map for next step, with all the chosen particles and the mass function of the grid around each body, for each body particle according to the fusion function.

13 Claims, 7 Drawing Sheets

(51) Int. Cl.
*G01S 13/32* (2006.01)
*G01S 13/86* (2006.01)

(56) References Cited

U.S. PATENT DOCUMENTS

2016/0265930 A1* 9/2016 Thakur ............... G05D 1/0088
2018/0046735 A1* 2/2018 Xu ........................... G06F 7/02

OTHER PUBLICATIONS

Mullane J. Vo Bn Et al., A random set formulation for Bayesian SLAM in intelligent Robots and systems, 2008, IROS, IEEE/RSJ INternational Confrence on Sep. 22, 2008 (7 pages).

Schuster F, Worner et al, "Robust localization based on radar signal clustering in intelligent vehicles", Symposium (IV), 2016 IEEE, Jun. 19, 2016, pp. 839-844 (abstract).

Mullane J. Vo Bn Et al., A random set formulation for Bayesian SLAM in intelligent Robots and systems, 2008, IROS, IEEE/RSJ INternational Confrence on Sep. 22, 2008 (abstract).

International Search Report for PCT/IL2018/050103, dated May 17, 2018 (2 pages).

Written Opinion of the International Searching Authority for PCT/IL2018/050103, dated May 17, 2018 (5 pages).

* cited by examiner

RADAR-BASED SYSTEM AND METHOD FOR REAL-TIME SIMULTANEOUS LOCALIZATION AND MAPPING

FIELD OF THE INVENTION

The present invention relates to the field of simultaneous mapping of the environment while localizing of moving platforms, such as vehicles (e.g., autonomous cars), robots, and Unmanned Aerial Vehicles (UAVs, such as drones) in the environment. The invention can be used but not limited to mapping systems and/or collision avoidance systems and/or guidance systems for moving platforms. More particularly, the invention relates to a system and method for real-time Simultaneous Localization And Mapping (SLAM) for sensing devices that provide a point cloud (a point cloud is a set of data points in some coordinate system, which are intended to represent the external surface of an object) output.

BACKGROUND OF THE INVENTION

As technology development is rapidly increasing, the demand for autonomous moving platforms has also increased. One of the widespread moving platforms is an autonomous car. Another moving platform is a drone.

An autonomous car eliminates the need of a driver in the car. An Autonomous car needs to be able to map the environment and to localize it with respect to other moving or stationary objects on the road, in order to safely maneuver in the environment.

A drone, also known as Unmanned Aerial Vehicle (UAV) is an aircraft without a pilot on board. The UAVs are used in numerous ways, from flying a UAV as a hobby, photography, as a cargo delivery means environmental monitoring and many other purposes in a civilian life to various purposes in the military and law enforcement authorities. The flight of a UAV can be controlled in several ways. It can be controlled by an operator from the ground, with a remote control or autonomously by a computer. When an operator controls the UAV, the flight usually takes place in the vicinity of the user. The user has full control on the UAV and he is solely responsible to land the aircraft safely after the mission is completed. The user must see the UAV in order to avoid its crash against other objects. Naturally, this type of flight control is limited to small areas in the field of view of the user.

In order to increase the range of uses of UAVs, to employ them for distant missions and where reaction time of a human is not fast enough, distributed processing systems and autonomous (or semi-autonomous) control systems were designed. These systems operate under constantly changing conditions, make real-time decisions and react to the changes with least human intervention or no human intervention at all. Distributed processing systems are systems where multiple control devices are used simultaneously to control the UAV (in contrast to non-distributed systems, where single control device is used).

Autonomous moving platforms collect information on their surroundings and advance according to its tasks and environmental conditions when adapting to changing surroundings.

The Guidance Navigation & Control (GNC) software of an autonomous moving platform is designed to control the motion of the moving platform. Part of its functionality is to avoid collisions between the moving platform and obstacles. Usually a camera that is installed on the moving platform images the environment and a processor on the moving platform performs image processing algorithms, analyzes the image data and sends instructions regarding required maneuvers to the GNC system of the autonomous moving platform. However, image processing methods involves very complex algorithms, which requires a strong processing core, do not work under all weather and conditions and have poor estimation of distance. Another drawback of image processing is the high power consumption of the system.

Image processing with high resolution requires expensive equipment to be installed on the moving platform, expensive and power consuming software (processing program) and hardware—computer and processor that are capable of performing complicated data processing operations as fast as possible. In case of a UAV, even more than any other moving platform, hardware constraints include low weight, small size and low-power requirements, since heavy hardware requires powerful engines and strong batteries.

Also, image processing solutions are limited in range measurements, since range measurement is inferred indirectly, using stereoscopic vision, and the main limitation for range estimation is the required distance between the cameras (to achieve overlapping field of view). This (relatively large) distance is not compatible with the small dimensions on UAVs or other small robots (and even cars), as there is not enough space to place two cameras such that range estimation will be reliable at longer distances. This degradation in performance increases when illumination conditions become worse, or when textures of different obstacles are similar to each other. This of course, limits the capabilities of early obstacle detection and localization. As a result, the moving platform should move slower, in order to keep safe range.

It is therefore an object of the present invention to provide an effective enhanced sensing system that can be used to plan and control moving platforms (such as UAVs and autonomous vehicles).

It is another object of present invention to provide method for continuously tracking stationary and moving objects, even when they are temporarily hidden by other objects, or exit the field of view of the sensing system, until the next time they appear.

Other objects and advantages of the invention will become apparent as the description proceeds.

SUMMARY OF THE INVENTION

The present invention is directed to a method for performing Simultaneous Localization And Mapping (SLAM) of the surroundings of an autonomously controlled moving platform (such as UAV or a vehicle), using radar signals, comprising the following steps:
 a) receiving samples of the received IF radar signals, from the DSP;
 b) receiving previous map from memory;
 c) receiving data regarding motions parameters of the moving platform from an Inertial Navigation System (INS) module, containing MEMS sensors data;
 d) grouping points (which may be part of point cloud data, received from a radar sensor) to bodies using a clustering process;
 e) merging bodies that are marked by the clustering process as separate bodies, using prior knowledge;
 f) for each body, creating a local grid map around the body with a mass function per entry of the grid map;

g) matching between bodies from previous map and the new bodies;
h) calculating the assumed new location of the moving platform for each on the mL particles using previous frame results and new INS data;
i) for each calculated new location of the mL particles with normal distribution, sampling N1 assumed locations;
j) for each body and each body particle from the previous map and for each location particle, calculating the velocity vector and orientation of the body between previous and current map, with respect to the environment using the body velocity calculated in previous step and sampling N2 particles of the body, or using image registration to create one particle where each particle contains the location and orientation of the body in the new map;
k) For each particle from the collection of particles of the body:
  k.1) propagating the body grid according the chosen particle;
  k.2) calculating the Conflict of the new observed body and propagated body grid, using a fusion function (such as evidence theory fusion of mass functions or a Bayesian function) on the parts of the grid that are matched;
  k.3) calculating Extra Conflict as a sum of the mass of occupied new and old grid cells that do not have a match between the grids;
  k.4) calculating particle weight as an inverse weight of the combination between Conflict and Extra conflict (e.g., $1/(1+\text{Conflict}+\text{Extra conflict})$);
l) for each N1 location particle, calculating the weight as the sum of the best weight per body for that particle;
m) resampling mL particles for locations according to the location weight;
n) for each body, choosing mB particles from the particles with location in one of the mL particles for the chosen location, and according to the particles weights;
o) for each body and each one of the mB particles calculate the body velocity using motion model (for example Kalman filtering, polynomial least square fitting, minimum variance fitting, and more); and
p) creating map for next step, with all the chosen particles and the mass function of the grid around each body, for each body particle according to the fusion function.

The radar signals may be received from an FMCW radar, periodically transmitting a LFM signal in the form of a triangular up/down chirp for a certain duration, to obtain a beat frequency being proportional to the range an inspected target.

The SLAM algorithm may employ particle filtering as the central estimator.

The Inertial Navigation System (INS) module may contain Micro-Electro-Mechanical System (MEMS)-based sensors, such as a manometer, an accelerometer, a gyroscope, a compass and a speedometer.

The present invention is also directed to a radar sensing module for a moving platform, which comprises:
a) a radar transceiver for:
  a.1) transmitting a modulated radar RF signal to an azimuth that corresponds to a desired direction;
  a.2) receiving reflections of the modulated radar RF signal from real and unreal targets covered by the sector;
  a.3) outputting an IF signal containing information regarding range, movement direction and speed of each real and unreal targets;
b) an Inertial Navigation System (INS) module, for providing data regarding motions parameters of the moving platform;
c) a processing module, adapted to:
  c.1) sample the IF signals and convert them into a digital form;
  c.2) perform a Simultaneous Localization And Mapping (SLAM) of the surroundings using data from the Inertial Navigation System, and according to the following steps:
d) receiving samples of the received IF radar signals, from the DSP;
e) receiving previous map from memory;
f) receiving data regarding motions parameters of the moving platform from an Inertial Navigation System (INS) module, containing MEMS sensors data;
g) grouping points to bodies using a clustering process;
h) merging bodies that are marked by the clustering process as separate bodies, using prior knowledge;
i) for each body, creating a local grid map around the body with a mass function per entry of the grid map;
j) matching between bodies from previous map and the new bodies;
k) calculating the assumed new location of the moving platform for each on the mL particles using previous frame results and new INS data;
l) for each calculated new location of the mL particles with normal distribution, sampling N1 assumed locations;
m) for each body and each body particle from the previous map and for each location particle, calculating the velocity vector and orientation of the body between previous and current map, with respect to the environment using the body velocity calculated in previous map;
n) for each particle from the collection of particles of the body:
  n.1) propagating the body grid according the chosen particle;
  n.2) calculating the Conflict of the new observed body and propagated body grid, using a fusion function on the parts of the grid that are matched;
  n.3) calculating Extra Conflict as a sum of the mass of occupied new and old grid cells that do not have a match between the grids;
  n.4) calculating particle weight as an inverse weight of the combination between Conflict and Extra conflict;
o) for each N1 location particle, calculating the weight as the sum of the best weight per body for that particle;
p) resampling mL particles for locations according to the location weight;
q) for each body, choosing mB particles from the particles with location in one of the mL particles for the chosen location, and according to the particles weights; and
r) creating map for next step, with all the chosen particles and the mass function of the grid around each body, for each body particle according to the fusion function.

DETAILED DESCRIPTION OF PREFERRED EMBODIMENTS

The present invention provides a method and a system for mapping and localization of the objects in the surroundings with respect to an autonomously controlled moving platform. The principle of operation of the system proposed by the present invention is based on a new and unique variation on the known Simultaneous Localization and Mapping (SLAM) technology with respect to sensors that translate their surroundings to a cloud of points, where for each point, it is possible to calculate the probability to be a target, another probability not to be a target and the probability of unknown points that are blocked from the radar view (e.g., a radar sensor). All different probabilities can be calculated directly by the DSP of the radar or deduced from the amplitude and/or the SNR of the point and knowledge of the radar performance. SLAM is a computer algorithm that maps an environment by determining the location of the sampling device and saving the environmental information collected by the device in an incremental way, to construct a map of the environment.

The proposed system combines the new version of SLAM technology and information received from the radar, which is located on the moving platform, in order to map the surrounding environment wherein the moving platform moves, and to detect the current relative location and relative speed between surrounding objects and the moving platform. This information is forwarded to the moving platform navigator that can use it to extrapolate its path and avoid collision.

The present invention uses radar instead of video/image signals, in order to obtain information regarding actual or impending obstacles. The equipment for transmission and reception of radar is much simpler than for video and images. One of the advantages of such a system is the speed of data processing. Data transmitted by the radar requires less software resources and as a result, simpler hardware. Therefore, the system is more lightweight than a system that is required for processing video signals. Weight reduction of a moving platform with a radar system requires less power consumption. Fast information processing of radar based system contributes to reduction of processing time and allows real-time operation.

Figure 1:
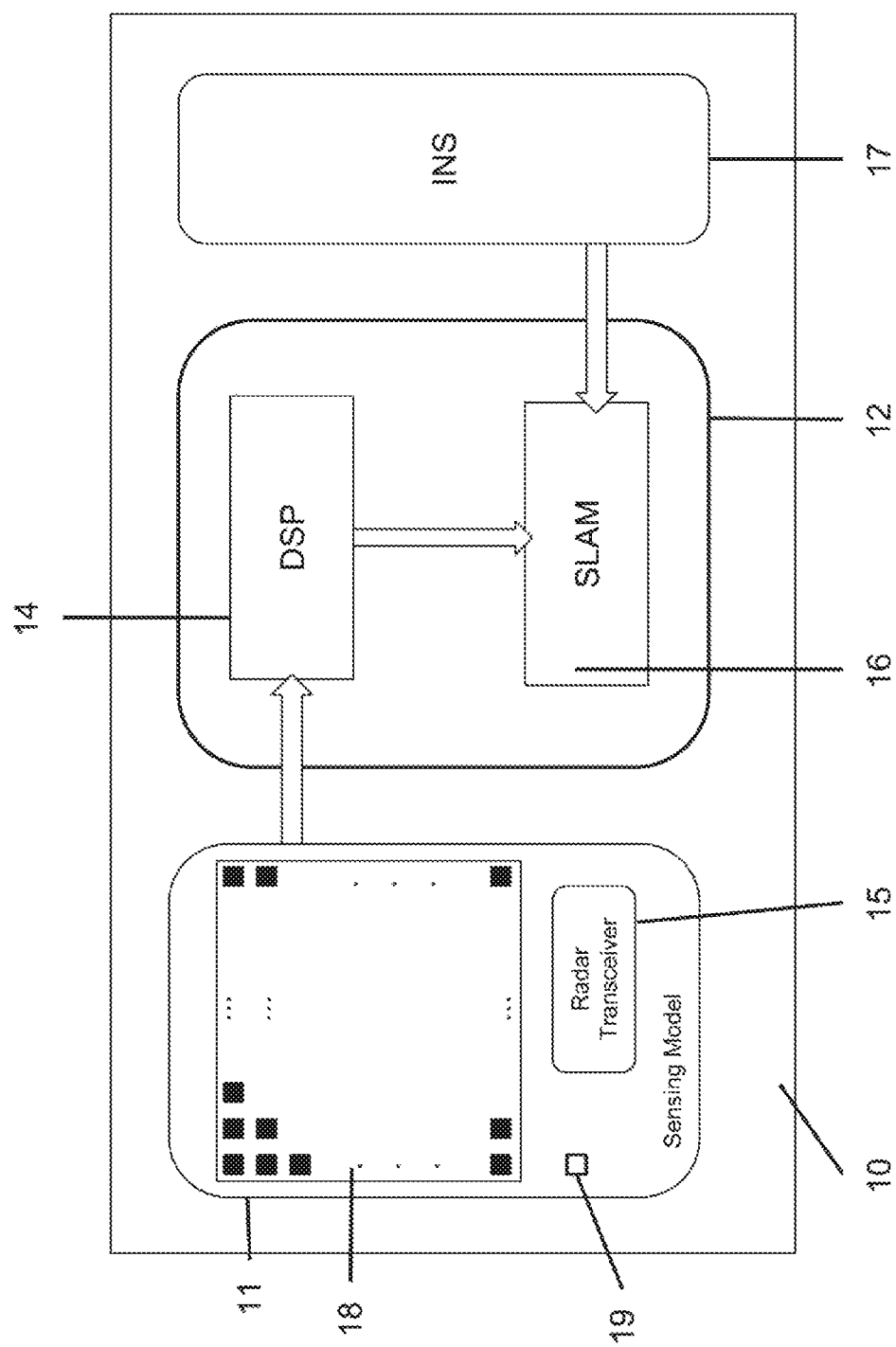
FIG. 1 is a block diagram of an advance sensing system for mapping the surrounding of the moving platform and localize the moving platform with respect to other stationary or moving objects in its surrounding, according to an embodiment of the invention.

FIG. 1 is a block diagram of an advance sensing system for mapping the surrounding of the moving platform and localizing the moving platform with respect to other stationary or moving objects in its surrounding, according to an embodiment of the invention. The system 10 consists of radar with sensing modules 11 that contains one transmitting antenna and a plurality of N receiving antennas, arranged in a square configuration, to create a radar that can estimate the range, azimuth and elevation of obstacles in its field of view.

The system 10 also includes a processing module 12 that forwards the IF signals from the sensing module 11 to a processing (DSP) circuitry 14, which samples them, filters them and creates a point cloud. Each point contains range, azimuth (optional), elevation (optional), Doppler velocity, the probability that there is a target at the point, the probability that there is no target at the point and the probability that we do not known if there is or there is not a target at the point (optional). Then SLAM operations (which will be described later on) are performed by a SLAM module 16, for allowing accurate separation between real and unreal targets and mapping the environment, based on analyzing signals received collected by radar sensing module 11. This information is used by the motion control system of the moving platform to perform the required maneuvers (such as speed reduction, trajectory adjustments) to avoid collisions with obstacles and to perform trajectory planning.

The SLAM module 16 receives inputs from an Inertial Navigation System (INS) 17, which usually includes gyroscope, an accelerometer, a magnetometer, a compass, an altimeter and a GPS and in case of cars, also speedometer. The INS 17 outputs data regarding the motions parameters of the moving platform, such as position, velocity, orientation and angular velocity, which are then used by the SLAM module 16.

The Radar Sensing Module:

The radar sensing module 11 consists of one or more printed transmitting antenna 19, two or more receiving printed antennas 18 and a radar transceiver 15 which is assembled on the back side of the antennas PCB, such that the transceiver will be connected to the antennas via appropriate transmission lines. For example, the antennas PCB may have 16 receiving channels, which are placed in a 4×4 square formation (with equal distances between the antennas).

Figure 2:
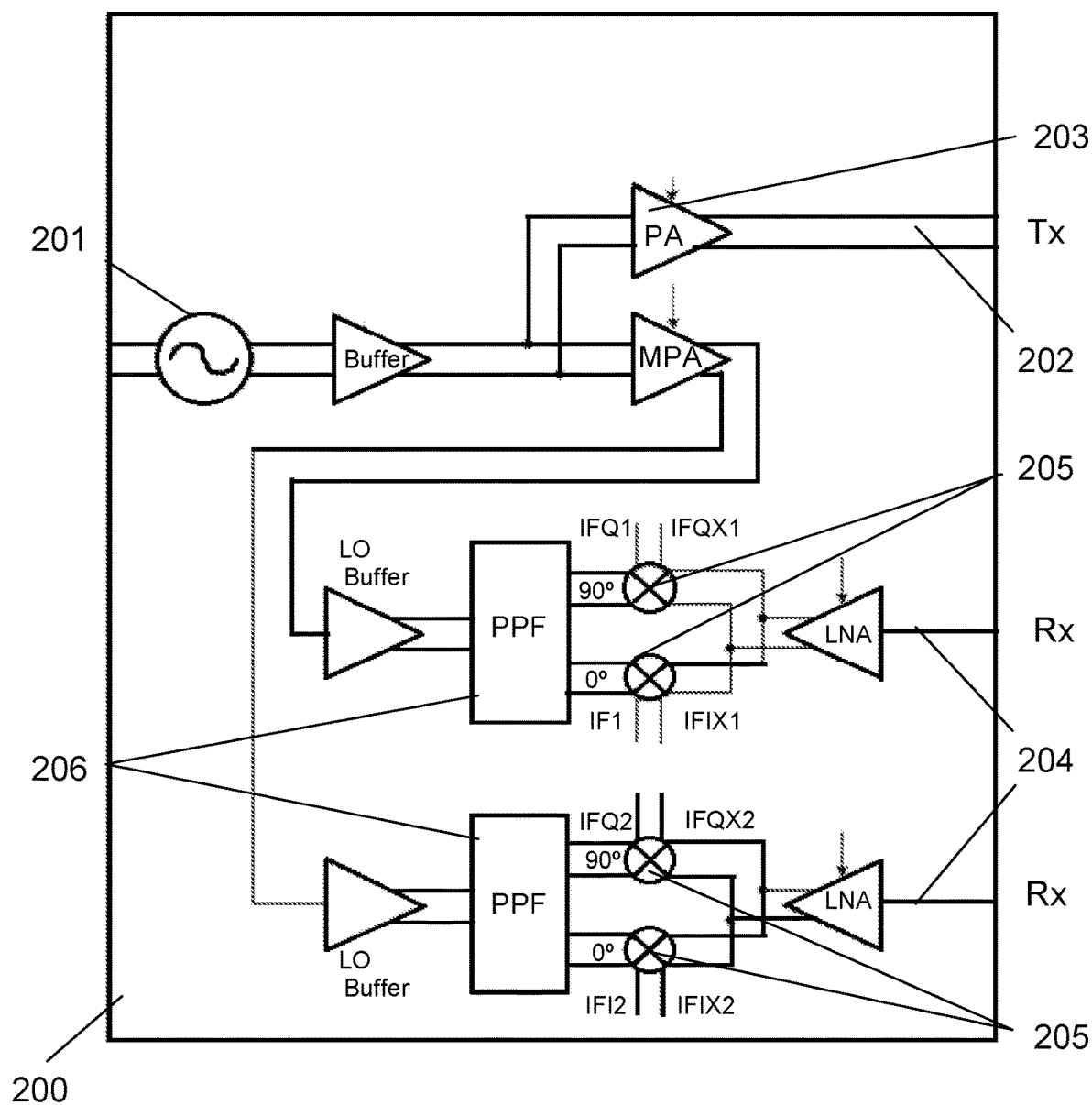
FIG. 2 is a block diagram of a radar transceiver that is used in the proposed radar sensing module.

FIG. 2 is a block diagram of a BGT24MTR12 radar transceiver (manufactured by Infineon) that is used in the proposed radar sensing module. The radar transceiver includes a Voltage Controlled Oscillator (VCO) 201, a transmitting channel Tx 202 boosted by a power amplifier 203 and p (=2 in this example) receiving channels Rx with mixers.

The transmitting channel Tx 202 transmits by a transmitting. Each of the p (≥2) receiving channel Rx 204 receives by a receiving, for Direction Of Arrival (DOA) or azimuth and elevation (in case p>2 and not all the antennas are deployed on one line) estimation. The VCO 201 is modulated to transmit modulated radar. The modulated radar (RF) signal hits the target (if exists) and the reflected (RF) signal is received by p receiving (Rx) channels 204. Each receiving channel enters a mixer 205, which performs down-conversion of the received reflected (HF) signal, using modulated radar signal of the VCO 201 as a Local Oscillator (LO). In this example, each LO signal feeds a mixer via a polyphase quadrature filter (PQF) 206, which is a filter bank which splits an input signal into a given number N (mostly a power of 2) of equidistant sub-bands. The resulting IF signals then can be processed by a DSP 14 to retrieve information about the estimated azimuth, elevation, speed and distance of the target. Of course, other methods to get In-phase Quadrature down-conversion may be used.

Figure 3:
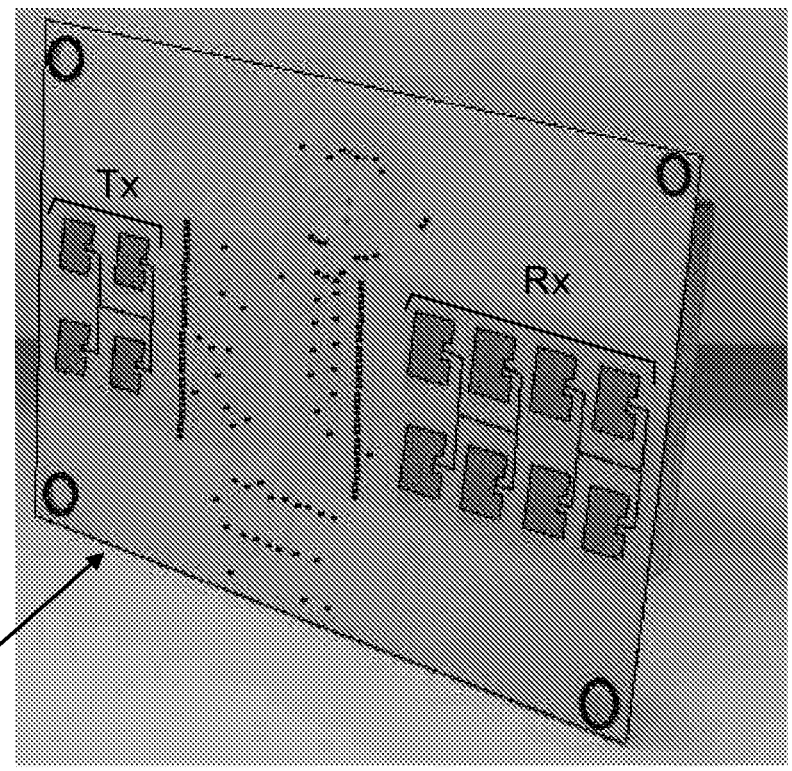
FIG. 3 shows an example of an array of printed antennas with 45° azimuth beam-width.
Figure 4:
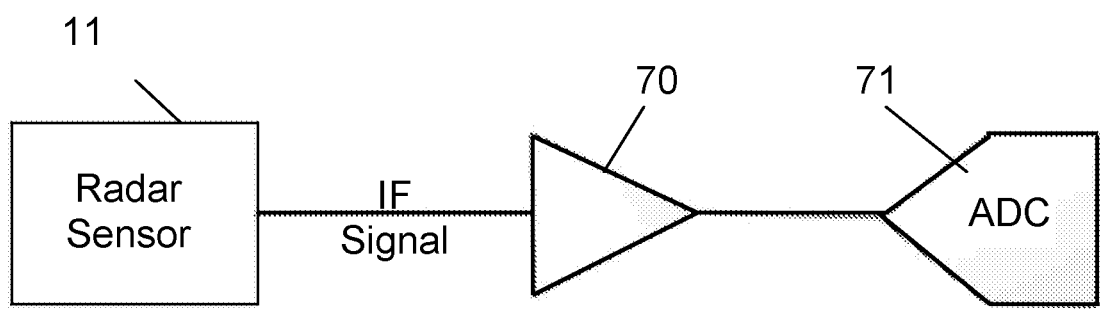
FIG. 4 shows a 2p X IF (Intermediate Frequency) amplification chain with ADCs.

FIG. 3 shows an example of an array of printed antennas, such that each antenna has 45° azimuth beam-width. Here there is one transmitting antenna Tx and p=2 receiving antennas, Rx.

Figure 5:
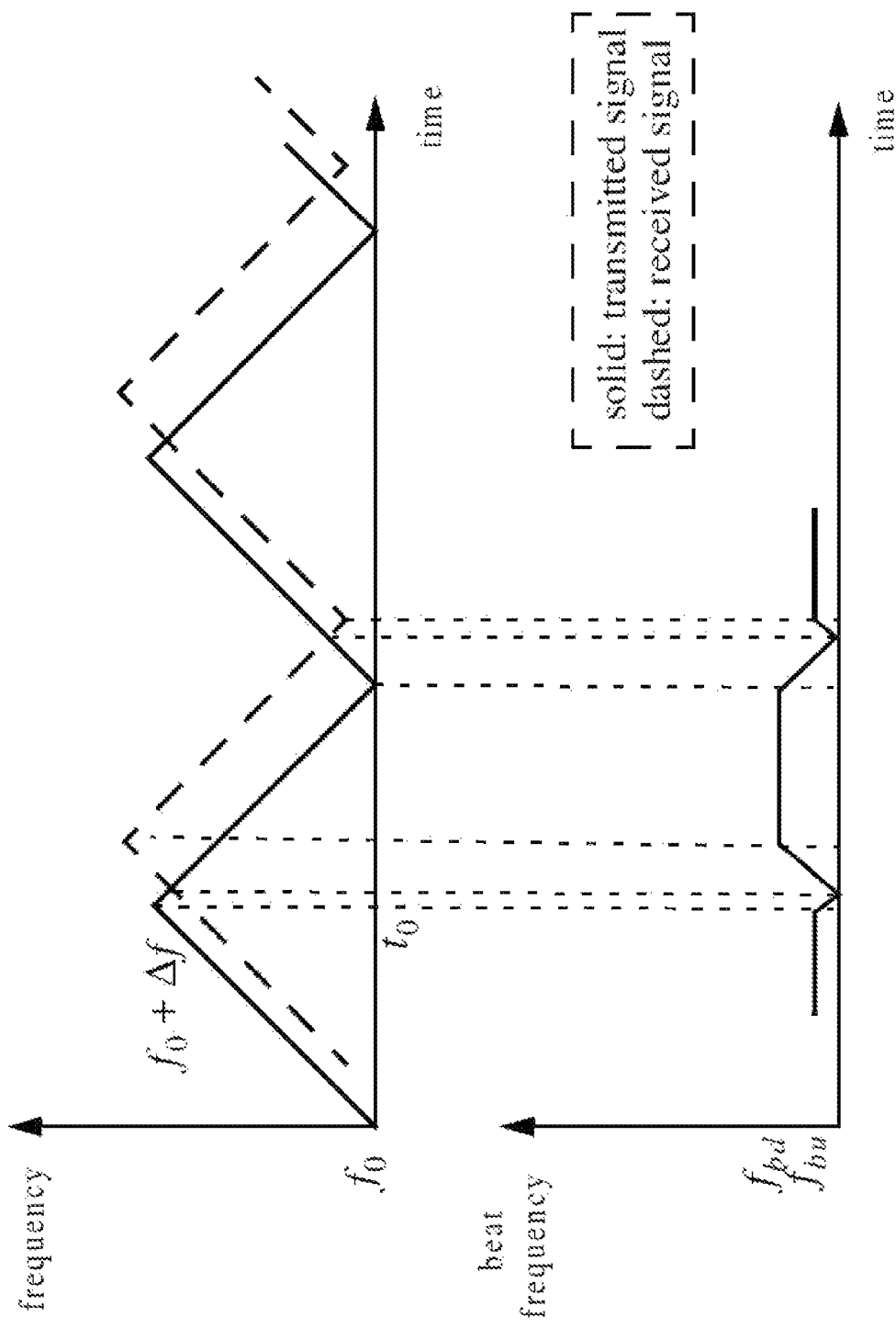
FIG. 5 (prior art) shows the transmitted and received LFM signals and beat frequency, for a moving target.

The system proposed by the present invention uses an FM-CW radar, where a triangular (up/down) chirp (Linear Frequency Modulation—LFM) signal (for example around 24 GHz with a bandwidth of 250 MHz or around 78 GHz with bandwidth of 1 GHz) is transmitted for a certain duration. While transmitting, the echoes are received by the receiver and mixed with the transmit signal, and the result is band-pass filtered to produce a superposition of beat frequencies. FIG. 5 (prior art) shows the transmitted and received LFM signals and beat frequency, for a moving target. The beat frequency $f_b$ is defined as $$f_b = f_{received} - f_{transmitted}$$

When the target is not stationary the received signal will contain a Doppler shift term in addition to the frequency shift due to the time delay $\Delta t$. In this case, the Doppler shift term subtracts from the beat frequency during the positive portion of the slope. Alternatively, the two terms add up during the negative portion of the slope. The beat frequency during the positive (up) and negative (down) portions of the slope are defined as $f_{bu}$ and $f_{bd}$, respectively. The range to the target and target radial velocity (the radial velocity of an object with respect to a given point is the rate of change of the distance between the object and the point. That is, the radial velocity is the component of the object's velocity that points in the direction of the radius connecting the object and the point) as seen by the radar can be computed from $f_{bu}$ and $f_{bd}$. This method requires the processing algorithm to match the targets detected in the positive slope with targets detected in the negative slope, which might have different IF frequency. Another way of calculating the Doppler shift is by transmitting a series of up (or down) chirps and calculate the 2-dimensional (2D) Fourier transform on the 2D data (first dimension is the number of chirps and second dimension is the sample number within the chirp) to get a 2D frequency vector, where one dimension of the frequency can be translated to range and the other to Doppler shift.

Since the beat frequency is proportional to the delay, and the delay is proportional to range, knowledge of the beat frequency of any target entails knowledge of the range of that target. Multiple targets can be separated by taking the Fourier Transform of the received signal, and determine range through frequency.

However, radar sensing suffers from the "multipath" effect, where the bin from the radar hit the target in an angle that might direct the bin to hit another reflecting surface (as the earth's surface or building surfaces) before reaching the receiving antennas. This can cause "ghost" targets in the wrong direction (as the last surface the bin hits) and wrong distance of the actual targets (the bin travel longer before reaching the radar).

Another problem is that targets with strong reflection can result in interference of smaller targets, like ground and humans. In this case, a bigger target can cause the signal of the smaller target to shift in direction (especially in cases with radar with p=2 receiving antennas) or mask the small target entirely. Moreover, the target matching procedure might generate "ghost" targets caused by matching frequencies received from different targets. As a result, target detection using radar sensing should be further processed, in order to separate between real and unreal targets.

The present invention solves this problem of separating between real and unreal targets and tracking and remembering targets in frames where they are obscured by other target, by combining a novel SLAM technology with the information that has been received from radar sensing. Since the proposed SLAM algorithm provides information regarding movement of the moving platform and tracks the motion of the different objects between frames received from the DSP unit 14, it is possible to estimate where each target should be, according to its movement direction and speed. The proposed SLAM algorithm is therefore used to build a model of how each target should move.

The Processing Module

The system 10 has a single processing module 12 (shown in FIG. 1), which includes a CPU (microprocessor, DSP, FPGA etc.) and a memory unit. The DSP 14 and SLAM 16 can run on the same CPU and memory or have different components each, depending on the strength and memory size of the chosen components.

Digital Signal Processing

The DSP 14 receives as input the sampled signal from the radar per radar frame. Radar frame is any pre-determined number of up and down chirps. For example, a frame can contain two sets of one up chirp and one down chirp or a set of 36 up chirps each from a different Tx antenna. According to existing technology, the DSP then averages the signal coherently, to enhance the signal and calculate the distance, Doppler velocity, azimuth and elevation using Fast Furrier Transform (FFT) algorithm or any other method known in the literature. The output of the DSP for each frame is a point cloud, where each point contains the range, radial (Doppler) velocity, azimuth and elevation (or direction, in case the signal received by the DSP do not contain elevation, as in the case where all the receiving antennas are on a single line). In addition, each point in the cloud has assigned with an amplitude (or power) and\or SNR (signal to noise ratio). The amplitude and\or SNR can then be translated to the probability that there is a target at this point, and the probability that there is no target at this point (the sum of the probabilities is not necessarily 1, as there is an uncertainty, where each probability came from a different probability function, as known in the field). The difference between those probabilities and 1 is the probability that it is unknown if there is or is not a target at this point.

Simultaneous Localization And Mapping (SLAM) is the problem of concurrently estimating in real time the structure of the surrounding world (the map), perceived by moving exteroceptive sensors (which are sensitive to external stimuli), while simultaneously estimating the location of the moving platform and hence, the sensors location with respect to other object and or with respect to the world. The problem that the SLAM algorithm tries to solve is that on one hand, mapping of the environment depends on the location of the sensors and on the other hand the estimation of the location of the sensors depends on the map of the environment. Hence, the SLAM algorithm solves the problem by estimating the map and the location simultaneously. SLAM algorithm involves a moving platform, which embarks at least one exteroceptive sensor which is able to gather information about its surroundings and Inertial Navigation System (INS) 17 that provides estimation on the location and orientation of the moving platform and its sensors. In this case, the exteroceptive sensors (sensors that are used for the observation of environments and objects) are the radar sensing modules described above. The SLAM algorithm proposed by the present invention is suited specifically for radars, where each point has probabilities of containing or not containing targets.

SLAM consists of three basic operations, which are reiterated at each time step: The moving platform moves, reaching a new point of view of the scene. Due to unavoidable noise and errors, this motion increases the uncertainty on the moving platform localization. An automated solution requires a mathematical model for this motion, called the motion model.

The moving platform discovers bodies in the environment, which should be incorporated into the map, the map contains stationary bodies and moving bodies. Because of errors in the exteroceptive sensors, the location and relative radial velocity (Doppler) of these bodies will be uncertain. Moreover, as the moving platform location is already uncertain, these two uncertainties need to be properly composed. An automated solution requires a mathematical model to determine the position of the bodies in the scene from the data obtained by the sensors. This is called the inverse observation model.

The moving platform observes bodies that had been previously mapped, and uses them to correct both its self-localization and the localization of all bodies in space. In this case, both localization and bodies uncertainties decrease. An automated solution requires a mathematical model to predict the values of the measurement from the predicted bodies location and the moving platform localization (multiple algorithms/models may be used to model and predict the motion of the targets. These include, but not limited to, methods such as Kalman filtering, polynomial least square fitting, minimum variance fitting, and more). This is called the direct observation model.

With these three models and an estimator engine it is possible to build an automated solution to SLAM. The estimator is responsible for the proper propagation of uncertainties each time one of the three situations above occurs. A solution to SLAM needs to chain all these operations together and to keep all data valid and organized, making the appropriate decisions at every step.

A SLAM algorithm receives continuous data about the surrounding and fuses the data, to create a map of the environment and the location of the sensor in the environment, continuously. Since the location of the sensor in the environment affects the calculation of the map and the map around the sensor affects the localization of the sensor in the environment, the SLAM algorithms calculate the mapping and localization simultaneously.

The present invention describes a version of SLAM that can work with sensors that return a point cloud output, i.e., a list of points, where each point represents a location in the environment and additional data, like relative velocity, Signal to Noise Ratio (SNR) and the probabilities of the existence and absence of a target in this location, etc. Radar and sonar are examples of sensors that return point cloud outputs. The sensor decomposes any target in the environment to a list of points, according to the resolution of the sensor. For example, a wall will be returned as a large number of points, where each point will have a different distance, azimuth and elevation up to the resolution of the sensor (for example, for every 0.3 meters and 2°), and each will have a different radial velocity with respect to the moving platform.

Unlike other sensors (such as cameras), where if a target is spotted the existence of the target is not disputed, only its actual location, in a Radar, and other similar sensors (like sonar) the probability of the existence of a target is never 100%. As described before, noise and phantom targets might occur. The present invention takes this into account, to create a SLAM algorithm that is more suitable for Radars than the existing algorithms.

Existing SLAM algorithms that are more suitable for Radar handle each point separately, and create a map grid where each entry in the grid is treated as full or empty with some probability function or mass function (depends of the fusion function used, for example, Bayesian function or evidence mass function).

Unlike those algorithms, the proposed SLAM algorithm converts the point cloud to bodies, which allow the algorithm to track the bodies between frames and create a motion model per body. This enables the algorithm to track the bodies even if they are hidden temporarily by other bodies in the environment and to continuously estimate their location.

Figure 6:
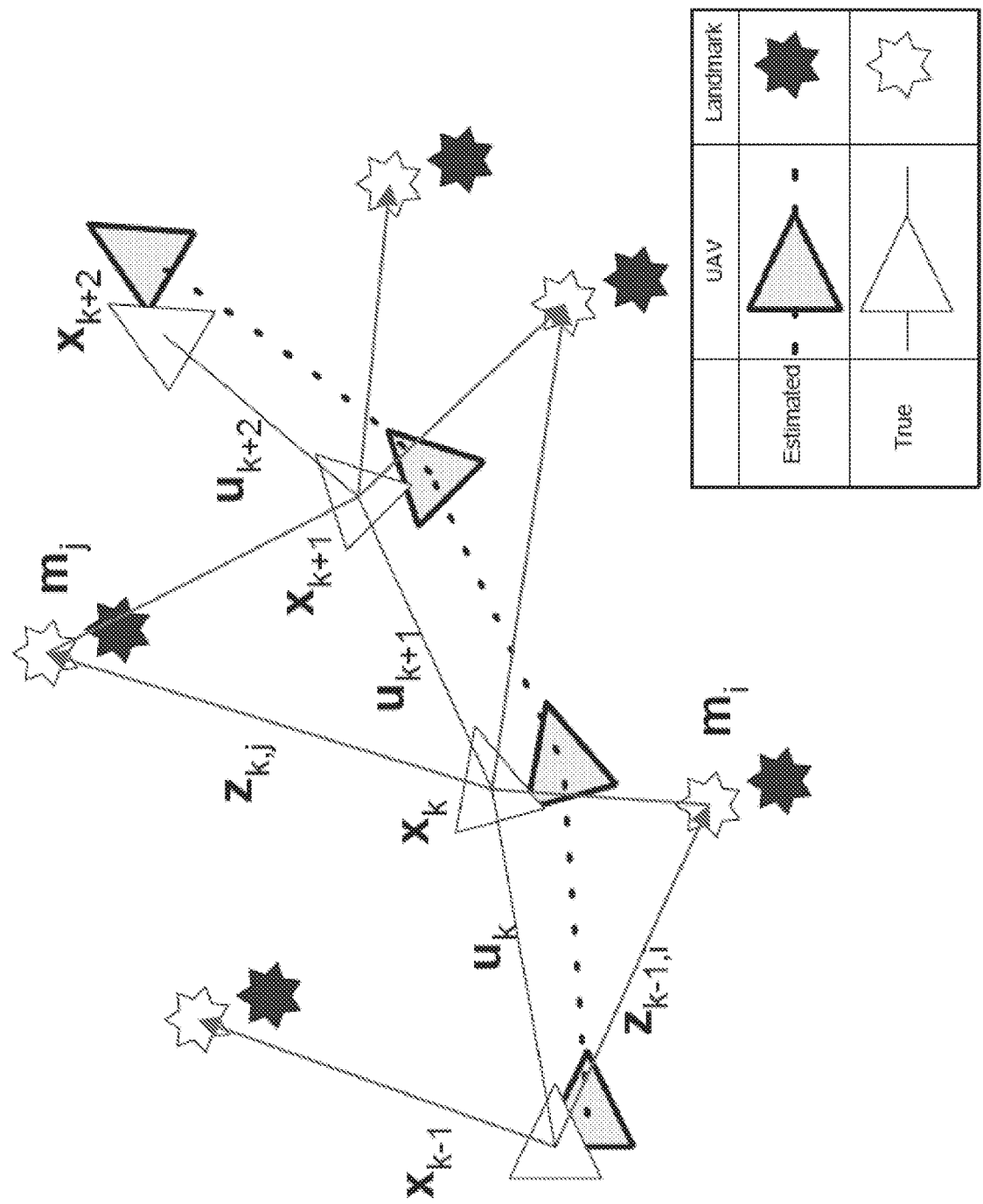
FIG. 6 (prior art) illustrates an essential SLAM task.

FIG. 6 (prior art) illustrates an essential SLAM problem. A simultaneous estimate of both moving platform and bodies locations is required. The true locations are never known or measured directly. Observations are made between true moving; platform and bodies locations.

Particle Filtering

The present invention uses particle filtering in two cases, to estimate the location of the moving platform and to estimate and predict the motion and location of each of the bodies in the environment. The filtering problem consists of estimating the internal states in dynamical systems, when particle observations are made, and random perturbations are present in the sensors, as well as in the dynamical system. A particle describes one possible start of the object (a state can describe location and kinematics). The particle filter contains a conditional probability (a.k.a. posterior distributions) of the state. At every frame, the particle filter randomly chooses (bootstraps) M (M can be equal but not limited to 1000) particles according to the posterior distribution. At the second stage, every particle is given a weight according to the chosen weight function that takes under consideration the observed sensor and INS 17 data. At the last stage m (<=M, can be but not limited to 20) particles are chosen randomly according to their weight as input to the next stage.

Image Registration/Correlation

As an alternative to the particle filtering process, one can apply a variety of techniques for the field of image processing, such as image correlation (a method that employs tracking and image registration techniques for accurate 2D and 3D measurements of changes in images, to measure full-field displacement and strains), or image registration (finds the best transformation between different sets of image data from different sensors, into one coordinate system), generalized to the radar's 4 dimensional output (range, azimuth, elevation and radial velocity), and to a chosen statistic to quantify the match between two point clouds, to find the best (in the sense of yielding the maximal match, or minimal conflict) relative shift of an object, as mapped in the previous frame to its current state and position. Finding the best shift is analogous to arbitrarily bootstrapping multiple particles, in a particle filter process, and keeping a single particle whose conflict with the current frame is minimal. From this point on, when particles are considered, it should be understood in a generalized sense particles (as the output of a particle filter), or a single particle, the output of image registration process. The image registration might have less accurate results than particle filtering but it reduces the highly consumed memory resources required by the particle filter algorithm.

While conventional image registration techniques find the best transformation such that the sum of the distance between the values of each matched pair of points in the different frames (matched pair of points are two points from two different frames that are located one above the other, when putting two different frames one above the other) will be minimal, the method proposed by the present invention uses modified image registration, according to which the conflict between all points is measured by defining a cost function which should be minimized.

Obtaining Information About Each Body in the Environment

For each body and each body particle (from previous map) the new location in the map is calculated according to its velocity from previous map. This way, after proceeding to the next frame N+1, all the calculations made for frame N are available location, velocity and orientation). Based on these calculations, it is possible to predict where a body will be in the next frame.

The New Proposed SLAM Algorithm

The present invention proposes a new SLAM algorithm that receives a point cloud as input, and groups the points into bodies. This addition allows the system to learn the shape of the bodies from a sub-cloud of points and the motion of the bodies in the environment between the frames and a better mapping of the environment. As a result, a better localization of the sensor in the environment is obtained. In addition, the signature of the body on the sensor over time will give the ability to identify the body, which will help to better describe the body shape and movement in the environment.

Figure 7:
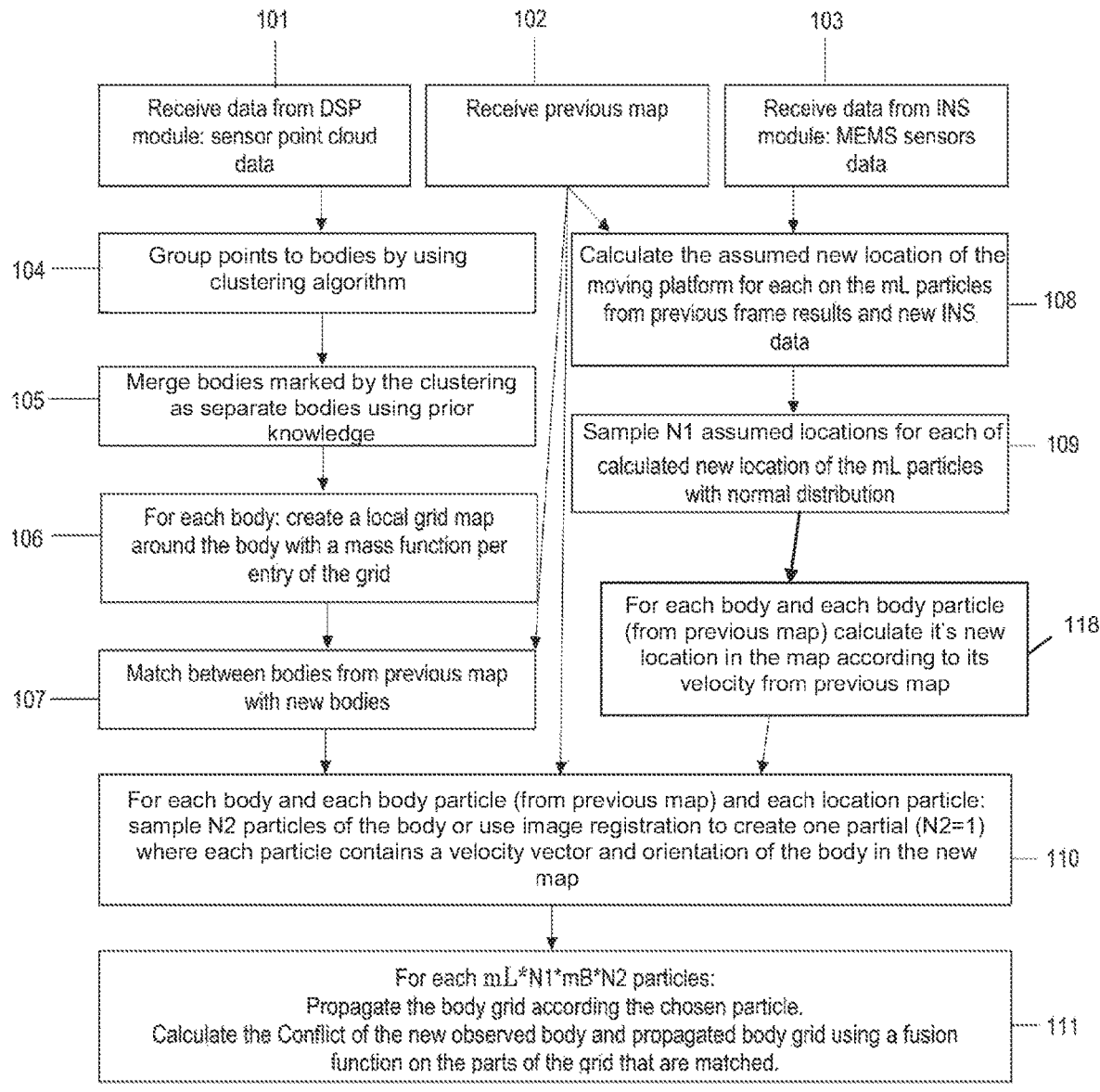
FIG. 7 is a flowchart of the SLAM process performed by the SLAM module, according to an embodiment of the invention.
Figure 7:
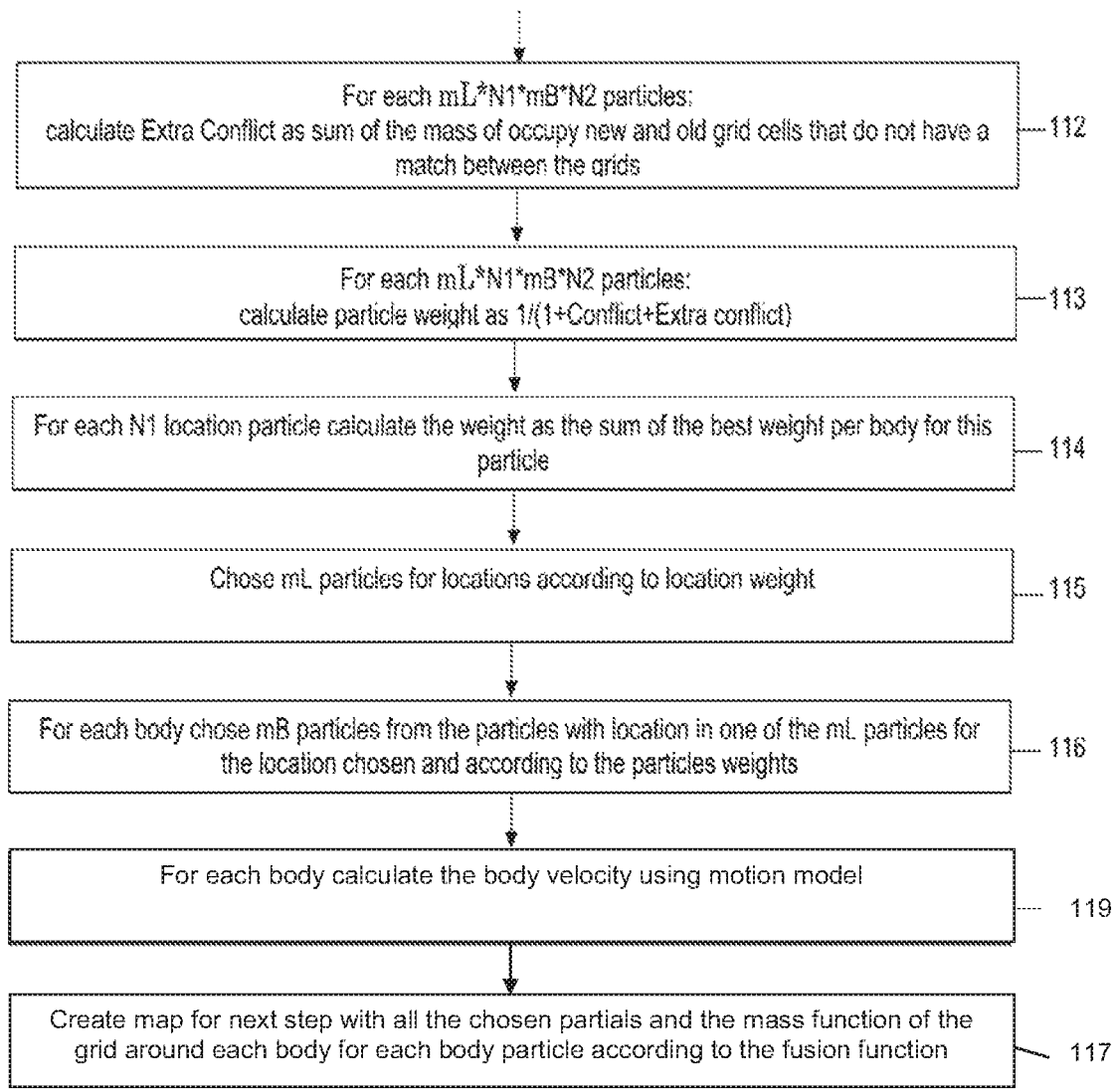

FIG. 7 is a flowchart of the SLAM process performed by the SLAM module, according to an embodiment of the invention.

The SLAM Algorithm Proposed by the Present Invention Receives the Following Input:

A. Sensor point cloud from the DSP;
B. previous location and map—a particle filter with mL (mL can be equal but not limited to 20) possible locations, where each location has its own calculated map. Each map contains a set of bodies, where each body is described by a particle filter with mB (mB can be equal but not limited to 20) possible locations, shape and velocity;
C. INS 17: Micro-Electro-Mechanical System (MEMS)-based sensors, which may include:
a manometer;
an accelerometer;
a gyroscope;
a compass;
a speedometer.

The proposed. SLAM algorithm includes the following steps:

At the first step 101, the system receives sensor point cloud data (Input A) e.g., from the DSP module (input A).

At step 102, the previous map from the previous frame is received (input B).

At step 103, the data of the estimated location of the moving platform from the INS module with the MEMS sensors is received (input C).

At next step 104, the point cloud is clustered to groups by a clustering algorithm such as, a Density-Based Spatial Clustering of Applications with Noise (DBSCAN) clustering (which is a data clustering algorithm that groups together points with many nearby neighbors, while marking as outliers points that lie alone in low-density regions, whose nearest neighbors are too far away). The data sent to the algorithm need to be normalized under some metric, since the data may be measured using different units, for example, the distance is in meters, the azimuth and elevations are in radians and velocity is in meter per second. An example for normalization can be, but not limited to, multiply the azimuth and elevation by 15 and divide the velocity by 6. The DBSCAN gets as input number of points in core grope (that is, minimal number of point for a point to be considered core point) and epsilon (max distance between points to be considered neighbors). Here 3 points and 2 meters can be examples for those parameters respectively. Each class is considered as a body.

At next step 105, bodies are merged according to prior knowledge. For example, the leaves of a tree will have returned a different velocity and hence might be sampled as many small bodies. But the entire tree will return a recognizable point cloud signature that will be used to combine all the leaves to a single body. At next step 106, a local Cartesian grid is created around each body so that it will contain the body and the surrounding of the body. Each entry in the grid contain a mass function, according to evidence theory, with the set of possible evidence are "Occupy" for the probability that the grid cell contains a target and "free" for the probability that the grid cell is empty. The mass function for each cell that match the location of one of the points of the body will contain as mass of "Occupy" (m(o)) the probability that the point is a target and for the mass of "free" (m(f)) the probability that the point is not a target. The mass of "unknown", that is, "Occupy" or "free", (m(u)) as 1−m(o)−m(f) and the mass of empty set, known also as conflict (m(c)) will be 0. In case of cell entries that are matched with the location of a point of another body the mass is set as free (m(f)=1) (considering the sum of mass is equal 1 that implies that the rest of the mass is 0). For any other cell, if there is a point in the cloud with the same azimuth and elevation with distance smaller than the distance of the cell the mass of the cell will set to unknown (m(u)=1) considering there is a target before the cell so the target might obscure any other target in the cell. Otherwise the mass is set to free (m(f)=1). In practice, without loss of generality, one may set these values as close to, but not exactly 1. For example, setting the unknown probability of a cell that is geometrically behind a sampled point as 0.95, rather than 1.

At next step 107, the data from step 102 with the previous map and the data from step 106 is used to match between the previous bodies and the new-found bodies. At step 108 the data from steps 102 and 103 are used to estimate the new location of the moving platform for each one of the mL location particles of the previous map combined with the data of the INS. At the next step 109 N1 particles are sampled from the particle filter of the location for each one of the mL particles using normal distribution. At step 118, each of the particles of each of the bodies from the previous map (step 102) is propagated to it's assumed location and orientation in the current step, according to the body velocity that is calculated as part as step 119 of the previous step.

At the next step 110, the data of step 107 is combined with the data of step 118 such that for each body and each particle of the body sample new N2 particles using a normal probability function around the center location of the particle of the previous step after its relocation of step 118.

At the next step 111, for each mL*N1*mB*N2 propagate the body local grid from the previous map according to the chosen particle. Match between the propagated grid (mark as PG) and new body grid from step 106 (mark as NG). Because of the rotation during the propagation there is high probability that there will be cells in PG that do not have matched cells in NG and cells in NG without matched cells in PG. For every matched cell entry between NG and PG calculate the conflict between the mass function of NG and mass function of PG. For the calculation of the conflict any fusion function can be used. The conflict is the mass of the empty set of the fusion of the mass functions (m12(c)). For example, the next fusion function can be used (m12 is the mass after the fusion, m1 is the mass of the first mass function and m2 of the second):

$$m12(c)=m1(o)*m2(f)+m1(f)*m2(o)+(m1(o)*m2(u)+m1(u)*m2(o))*(1-e^{\hat{}}(q))$$

In this example (unlike in classical evidence theory) we penalize the mass received from matching between occupy to unknown.

At the next step 112, calculate the Extra Conflict as the sum of the mass of "full" cells in PG that do not have match in NG and cells in NG that do not have match in PG.

At the next step 113, calculate for each of the mL*N1*mB*N2 particles the weight of the particle as 1/(1+Conflict+Extra Conflict).

At the next step 114, set the weight for each one of the location particles as the sum of the weights of the bodies where each body gives the highest weight of all the body particles that uses this particle location.

At the next step 115, chose mL particles for the location by resampling the location particles according to the weights calculated at step 114.

At the next step 116, for each body chose mB particles by resampling the body particles according to the weights calculated in step 113. For the resampling take only particles that belong to one of the location particles chosen at step 115.

At step 119, for each body and each one of the mB particles, calculate the body velocity using motion model. A motion model can include, but not limited to, Kalman filtering, polynomial least square fitting, minimum variance fitting, and more.

At the last step 117, create the new map by creating a new mass function for each chosen particle for each body by using any fusion function from evidence theory.

The results of combining the SLAM technology with the information that has been received from radar sensing is accurate mapping of the environment wherein the moving platform moves, where mapping of bodies allows mapping of all real targets. In addition, upon detecting a real target, this real target can be used as a body for creating an accurate map of the target, such as drawing contour lines of a building.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

The invention claimed is:

1. A method for performing Simultaneous Localization And Mapping (SLAM) of the surroundings of an autonomously controlled moving platform, using radar signals, comprising:
   a) receiving samples of the received IF radar signals, from the DSP;
   b) receiving previous map from memory;
   c) receiving data regarding motions parameters of said moving platform from an Inertial Navigation System (INS) module, containing MEMS sensors data;
   d) grouping points to bodies using a clustering process;
   e) merging bodies that are marked by said clustering process as separate bodies, using prior knowledge;
   f) for each body, creating a local grid map around said body with a mass function per entry of said grid map;
   g) matching between bodies from previous map and the new bodies;
   h) calculating the assumed new location of said moving platform for each on the mL particles using previous frame results and new INS data;
   i) for each calculated new location of the mL particles with normal distribution, sampling N1 assumed locations;
   j) for each body and each body particle from the previous map and for each location particle, calculating the velocity vector and orientation of the body between previous and current map, with respect to the environment using the body velocity calculated in previous map;
   k) for each particle from the collection of particles of the body:
      k.1) propagating the body grid according the chosen particle;
      k.2) calculating the Conflict of the new observed body and propagated body grid, using a fusion function on the parts of the grid that are matched;
      k.3) calculating Extra Conflict as a sum of the mass of occupied new and old grid cells that do not have a match between the grids;
      k.4) calculating particle weight as an inverse weight of the combination between Conflict and Extra conflict;
   l) for each N1 location particle, calculating the weight as the sum of the best weight per body for that particle;
   m) resampling mL particles for locations according to the location weight;
   n) for each body, choosing mB particles from the particles with location in one of the mL particles for the chosen location, and according to the particles weights; and
   o) creating map for next step, with all the chosen particles and the mass function of the grid around each body, for each body particle according to said fusion function.

2. A method according to claim 1, wherein the radar signals are received from an FM-CW radar, periodically transmitting a LFM signal in the form of a triangular up/down chirp for a certain duration, to obtain a beat frequency being proportional to the range an inspected target.

3. A method according to claim 1, wherein the SLAM algorithm employs particle filtering as the central estimator.

4. A method according to claim 1, wherein the points are part of point cloud data, received from a radar sensor.

5. A method according to claim 1, wherein the Inertial Navigation System (INS) module contains Micro-Electro-Mechanical System (MEMS)-based sensors.

6. A method according to claim 1, wherein the fusion function is evidence theory fusion of mass functions or a Bayesian function.

7. A method according to claim 5, wherein the Micro-Electro-Mechanical System (MEMS)-based sensors are selected from the group of:
   a manometer;
   an accelerometer;
   a gyroscope;
   a compass;
   a speedometer.

8. A method according to claim 1, wherein the moving platform is a UAV or a vehicle.

9. A method according to claim 1, wherein the inverse weight is 1/(1+Conflict+Extra conflict).

10. A method according to claim 1, wherein whenever the platform is stationary, omitting steps h) and i).

11. A method according to claim 1, wherein the velocity vector and orientation of the body between previous and current map, with respect to the environment is calculated using image registration to create one particle where each particle contains the location and orientation of the body in the new map.

12. A method according to claim 1, wherein the body velocity for each body and each one of the mB particles is calculated using a motion model.

13. A radar sensing module for a moving platform, comprising:
   a) a radar transceiver for:
      a.1) transmitting a modulated radar RF signal to an azimuth that corresponds to a desired direction;
      a.2) receiving reflections of said modulated radar RF signal from real and unreal targets covered by said sector;
      a.3) outputting an IF signal containing information regarding range, movement direction and speed of each real and unreal targets;
   b) an Inertial Navigation System (INS) module, for providing data regarding motions parameters of said moving platform;
   c) a processing module, adapted to:
      c.1) sample said IF signals and convert them into a digital form;
      c.2) perform a Simultaneous Localization And Mapping (SLAM) of the surroundings using data from said Inertial Navigation System, and according to the following steps:
   d) receiving samples of the received IF radar signals, from the DSP;
   e) receiving previous map from memory;
   f) receiving data regarding motions parameters of said moving platform from an Inertial Navigation System (INS) module, containing MEMS sensors data;
   g) grouping points to bodies using a clustering process;
   h) merging bodies that are marked by said clustering process as separate bodies, using prior knowledge;
   i) for each body, creating a local grid map around said body with a mass function per entry of said grid map;
   j) matching between bodies from previous map and the new bodies;
   k) calculating the assumed new location of said moving platform for each on the mL particles using previous frame results and new INS data;
   l) for each calculated new location of the mL particles with normal distribution, sampling N1 assumed locations;
   m) for each body and each body particle from the previous map and for each location particle, calculating the velocity vector and orientation of the body between previous and current map, with respect to the environment using the body velocity calculated in previous map;
   n) for each particle from the collection of particles of the body:
      n.1) propagating the body grid according the chosen particle;
      n.2) calculating the Conflict of the new observed body and propagated body grid, using a fusion function on the parts of the grid that are matched;
      n.3) calculating Extra Conflict as a sum of the mass of occupied new and old grid cells that do not have a match between the grids;
      n.4) calculating particle weight as an inverse weight of the combination between Conflict and Extra conflict;
   o) for each N1 location particle, calculating the weight as the sum of the best weight per body for that particle;
   p) resampling mL particles for locations according to the location weight;
   q) for each body, choosing mB particles from the particles with location in one of the mL particles for the chosen location, and according to the particles weights; and
   r) creating map for next step, with all the chosen particles and the mass function of the grid around each body, for each body particle according to said fusion function.

* * * * *